Jan. 25, 1949.  K. N. MATHES  2,460,140

METHOD OF PASTING MICA

Filed Aug. 6, 1947

Inventor:
Kenneth N. Mathes,
by *Attorney signature*
His Attorney.

Patented Jan. 25, 1949

2,460,140

UNITED STATES PATENT OFFICE 2,460,140

METHOD OF PASTING MICA

Kenneth N. Mathes, Schenectady, N. Y., assignor to General Electric Company, a corporation of New York Application August 6, 1947, Serial No. 766,626

8 Claims. (Cl. 154—2.6)

This invention relates to pasted mica products. More particularly it relates to pasted mica products having high resistance to shearing forces.

An objection to the use of pasted mica in installations wherein it is subjected to large shearing forces such as in its use as insulation for commutator side segments is the tendency of the pasted mica to deform through slippage, the flakes of mica riding over one another and out of place with the binder acting in some cases as a lubricant. Such slippage is most pronounced when the binder has not been properly cured or hardened but occurs to a lesser degree in the aged or cured product when subjected to excessive shear. The degree of slippage also increases with the percentage of binder present, leading to the use of as little binder as is requisite to hold the mica flakes together without providing any excess to permit the gliding of flakes over one another or to collect in pockets, only to be squeezed out under operating conditions carrying with it flakes of mica. In some applications, as in commutator side segment insulation, if slippage occurs beyond a limit of several ten-thousandths of an inch, the mica may extend beyond the periphery of the commutator and copper side segments become displaced with resultant excessive brush wear and sparking and eventual burning out of the machine.

It is an object of my invention to produce a pasted mica product in which the slippage of mica flakes during actual use is nil or negligible.

Another object is to produce a pasted mica product which will resist deformation by slippage under high temperatures and high pressures and shearing forces.

A further object of the present invention is to produce a pasted mica sheet for use as commutator side segment insulation which will resist slippage under the high temperatures and shearing forces found in dynamo-electric machinery.

Another object of my invention is to provide an apparatus wherein pasted mica may be treated during curing so that slippage of the mica flakes in actual use will be nil or negligible.

Figure 1:
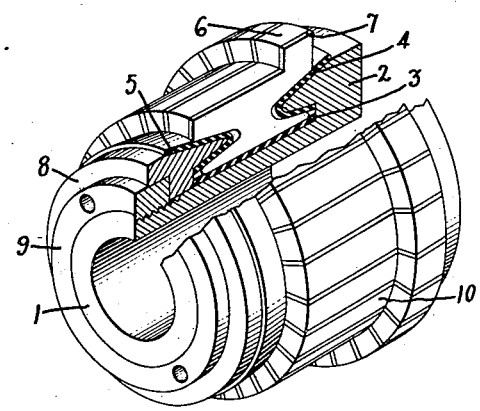
Figure 2:
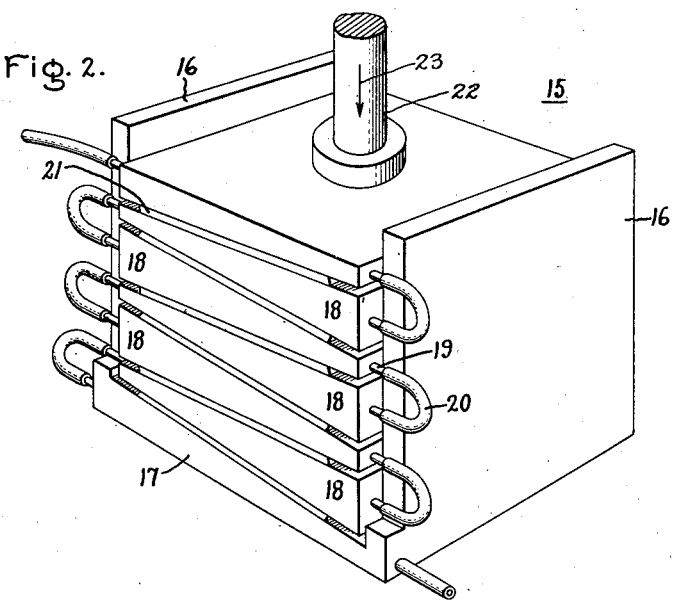
Figure 3:
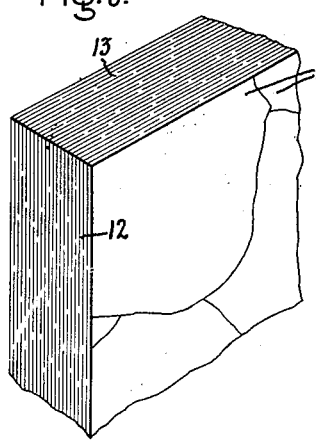
Figure 4:
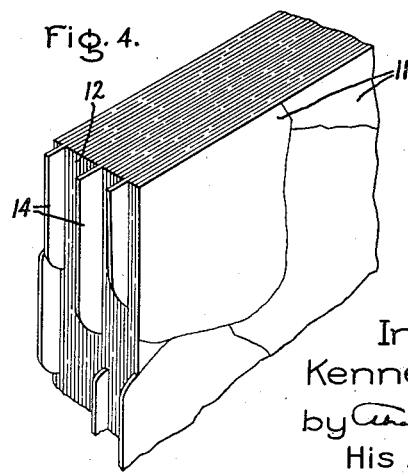

Other objects will become apparent from an examination of the ensuing description and the drawing in which Fig. 1 is a perspective cutaway view of a commutator illustrating a use of pasted mica; Fig. 2 is a perspective view of the preferred apparatus used to prepare the pasted mica of the present invention; Fig. 3 is a perspective view of a pasted mica sheet before treatment by the present process, and Fig. 4 is a perspective view of the pasted mica sheet of Fig. 3 after treatment.

I have found that the slipping of pasted mica under actual conditions of use which may include high temperatures, high pressures and large shearing forces may be obviated or reduced to a minimum by fixing each mica flake in such intimate contact with adjacent flakes during the curing process that further relative motion between them is negligible.

I have further found that the mica flakes in pasted mica may be so intimately bound together by applying heat and pressure to the article during the curing process as well as a shearing force which is parallel to the general plane of orientation of the flakes in the article and to its least dimension.

I have also found that a convenient manner of so interbinding the mica flakes in a pasted mica article is to place the articles in a fluid heated and cooled press between stacked wedge-shaped platens so oriented that a force applied to the faces of the platens and perpendicular to the stack will subject the pasted mica articles to a pressure, a component of which causes a shearing force to be applied parallel to the face or least dimension of the article.

In the drawing Fig. 1 represents a typical end angle type commutator illustrating the use of the pasted mica of the present invention for side segment insulation. In the commutator having shell 1 which integral end cone 2 are mounted mica sleeve insulator 3, mica end cones 4 and 5, copper side segments 6 and pasted mica side segment insulators 7. The complete assembly is fixed together by means of end cone 8 which, as tightening nut 9 is drawn up, creates an arch pressure between side segments 6 and insulators 7 which holds the copper side segments and mica insulators tightly together. It has been found under present normal operation of dynamo-electric machinery in which high speeds and high temperatures are prevalent, that side segment insulation of ordinary pasted mica is subject to slippage in which the mica flakes are displaced. This condition results in creeping of the insulation outside the periphery of the commutator as well as displacement of the copper side segments, creating an out-of-round commutator, which causes excessive brush-sparking and eventual burning-out of the machine.

With a press 15 as shown in Fig. 2, sheets of raw pasted mica with thermosetting binder may be cured under heat and pressure in such a manner that subsequent slippage of the mica flakes therein in actual use is nil or negligible. Examples of such binders are shellac, the alkyd resins and compositions such as are set forth in U. S. Patent 2,319,780 to Pellett, dated May 25, 1943, and assigned to the same assignee as the present invention. The press proper comprises rigid end pieces 16 which are preferably made integral with base 17. Platens 18 are mounted in the press as shown in any desired number, each being tapered to the same extent toward one end at an angle ranging from 3° to 9° to produce a wedge-shaped side section. The platens have a limited amount of end play which permits them to move relative to one another. Actual practice has shown that this end play may range from 40 or 50 mils to about one-quarter inch depending upon the angle of platen taper, mica sheet thickness and other factors. As shown, the upper face of the base is tapered to mate with the adjacent face of the lower platen. While this increases the capacity of the press and is a preferable form, the upper face of the base could be made flat or untapered with the lowermost platen having a tapered face to match it. To allow for heating and cooling the platens 18 and base 17, these parts are made hollow or have passages therein for the flow of heating and cooling fluid which is conducted through the platens and base in series through conduits 19 and flexible tubes 20, the latter adjusting for relative motion between the platens. Steam and water are preferably used as heating and cooling fluids respectively, but any other fluid which will meet the requirements may be employed. In operation, sheets of raw pasted mica 21, i. e., with unhardened binder incorporated and pressed just enough to give a rough sheet shape, are placed between the platens and pressure exerted vertically downward through a force applied to ram 22 as shown by arrow 23, the platens and press base being simultaneously heated through the introduction of steam. Inasmuch as the faces of the pasted mica sheets 21 are at an angle to the pressure applied, being between the sloping or wedge-shaped platens 18, the force at any point on the sheets may be resolved into two components, one vertical to the sheet and another parallel to the sheet, the latter contributing primarily to slipping the mica. The sheets are made up of flakes in more or less haphazard overlapping arrangement and the flat surfaces of the flakes may be oriented in different planes, such diverse orientation being more pronounced when globules of binder have been entrapped between flake layers in the pasting process. The vertical component of the applied force will tend to reorient those flakes which are out of alignment and in the process will cause the sheet to reduce in thickness and spread out, each flake slipping over adjoining particles. If globules of binder are present, these will be spread out between the flakes possibly carrying with them flakes of mica which, being lubricated by an excess of still liquid or semi-liquid binder, slip relatively easily over one another to give an eventually thinner sheet at the expense of the extrusion of mica flakes and excess binder beyond the bounds of the original dimensions of the sheet. The force component parallel to the face of the sheet is strictly of shearing character and as such more instrumental in the slipping process than the vertical component. Binder coated mica flakes being of a slippery nature and prone to slip under a shearing force, the flakes in the sheets under treatment, as well as the binder, will be readjusted to the point where each flake is in such position in relation to adjacent flakes as to have the most intimate possible contact with them. If then, the pasted mica sheet as finally cured and hardened has all its mica flakes interlocked in very close contact, it will remain stable and unyielding in actual use even though subjected to high pressures, shearing stresses and temperatures.

The preferred period of curing for any particular binder may be experimentally determined by preslipping sample sheets in a press in which the movement of an unrestrained platen may be used as a measure of the mica slippage. The curing time for any binder then may be taken as that period after which further application of the heat and pressure selected will produce negligible further slippage.

After the above procedure a sheet which in its raw, uncured state might have had smooth, square edges such as at 12 and 13 in Fig. 3 will have flakes of mica such as at 14 in Fig. 4 extending therefrom. The slipped or treated sheet may then be fashioned into the desired shape and used without further damaging slippage. In the case of commutator side segment insulation, the risk of mica slippage while the machine is in actual service with resultant, excessive brush sparkage and burning out is obviated, as is also the present long run-in time which is the only alternative.

While I have illustrated a curing cycle in which heat, pressure and a component shearing force are applied simultaneously for the particular binder used, it will be understood that different binders may react more favorably and cure more readily by the application of various sequences and combinations of heats, pressures, and shearing forces. For example, heat may be applied for a definite period followed by heat and pressure or pressure alone and so on.

Likewise, while I have derived my shearing force from a component of a downward pressure on tapered platens, I may obtain the shearing force by any other suitable means. For example, I may use flat, untapered platens and move each one relative to the others in shear by forces applied to their ends in addition to downward pressure on the platens. In such case in order to maintain the shearing force and the force creating the downward pressure in the same relative proportion as when using platens tapered 3° to 9°, the end forces should be from .05 to .16 times the downward force, these values being the sines of approximately 3° and 9°.

What I claim as new and desire to secure by Letters Patent of the United States is:

1. In the manufacture of pasted mica articles the process of adjusting the mica flakes therein which comprises cementing the flakes together with a resinous binder and curing under heat and pressure said pressure being so applied that the general plane of said mica flakes is at an angle to a component of the pressure-producing lines of force.

2. In the manufacture of pasted mica articles the process of adjusting the mica flakes therein which comprises cementing the flakes together with a resinous binder and curing under heat and pressure with simultaneous application of a shearing force to said article parallel to the plane of the flakes therein.

3. In the manufacture of pasted mica articles the process of adjusting the mica flakes therein which comprises cementing the flakes together with a resinous binder, and curing the articles with heat and pressure, said pressure acting to apply a shearing force along the face of the article of from 0.05 to 0.16 times that of the pressure-creating force.

4. In the manufacture of pasted mica articles the process of adjusting the mica flakes therein which comprises cementing the flakes together with a thermosetting binder and curing under heat and pressure, said pressure acting to apply a shearing force along the face of the article equal in magnitude to the pressure-creating force times the sine of an angle of from 3° to 9°.

5. In the manufacture of pasted mica articles the process of adjusting the mica flakes therein during curing which comprises cementing the flakes together with a resinous binder, applying heat and pressure to the face of the composite structure of mica flakes and binder and a shearing force parallel to the general plane of the mica flakes 6. In the manufacture of pasted mica articles the process of adjusting the mica flakes therein which comprises cementing the flakes together with a resinous binder, applying pressure to the face of the composite structure of mica flakes and binder and a shearing force parallel to the plane of the flakes therein, and then heating said article while continuing the application of said shearing force and pressure.

7. In the manufacture of pasted mica articles the process of adjusting the mica flakes therein which comprises cementing the flakes together with a resinous binder and treating under heat followed by the application of pressure to the face of the composite structure of mica flakes and binder and a shearing force to said article parallel to the plane of the flakes therein during continued heating of the article.

8. In the manufacture of pasted mica articles, the process of adjusting the mica flakes therein which comprises cementing the flakes together with a resinous binder, applying heat, then applying pressure to the face of the composite structure of mica flakes and binder and a shearing force parallel to the general plane of the mica flakes, and finally applying a combination of the heat and shearing force and pressure.

KENNETH N. MATHES.

REFERENCES CITED

The following references are of record in the file of this patent:

UNITED STATES PATENTS

| Number | Name | Date |
|--------|------|------|
| 389,519 | Lee | Sept. 11, 1888 |
| 2,231,718 | Hill | Feb. 11, 1941 |
| 2,319,780 | Pellett | May 25, 1943 |
| 2,363,323 | Hill | Nov. 21, 1944 |
| 2,363,324 | Hill | Nov. 21, 1944 |
| 2,430,123 | Jacob | Nov. 4, 1947 |

OTHER REFERENCES

Barringer & Mathes, "Synthetic Bonded Mica," in "General Electric Review," Oct. 1944, pp. 15–19.